Figure 1:
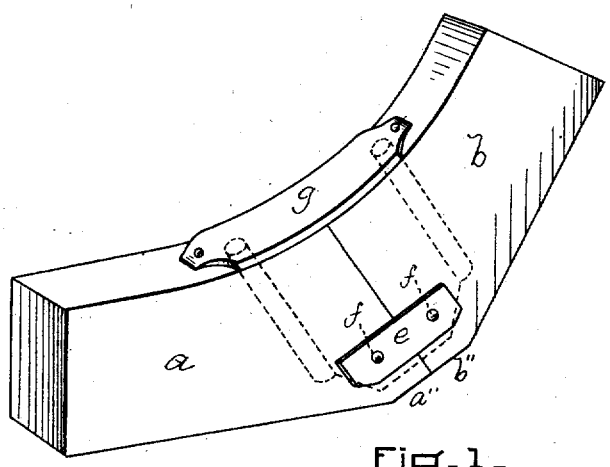

D. TRUE.

BOAT KNEE.

No. 10,270. Reissued Jan. 9, 1883.

WITNESSES

B. W. Williams

Joseph Ashbaugh.

INVENTOR

David True,

By his Atty.

Henry W. Williams

N. PETERS, Photo-Lithographer, Washington, D. C.

UNITED STATES PATENT OFFICE.

DAVID TRUE, OF SALISBURY, MASSACHUSETTS.

BOAT-KNEE.

SPECIFICATION forming part of Reissued Letters Patent No. 10,270, dated January 9, 1883.

Original No. 187,939, dated February 27, 1877. Application for reissue filed December 2, 1882.

*To all whom it may concern:*

Be it known that I, DAVID TRUE, of Salisbury, in the county of Essex and State of Massachusetts, have invented new and useful Improvements in Boat-Knees, of which the following is a specification.

This invention relates to those boat-knees which are made in two or more parts, and consequently require to be firmly and strongly held at the adjoining or adjacent edges of said parts in order that the knee may be as strong as or stronger than a knee depending upon artificial bending for its shape, and yet subject to none of the objections attaching to bent knees.

The knees to which this improvement applies are more particularly those used in connection with dories and similar craft.

Hitherto the inner ends of two portions of a boat-knee have been connected and held by means of sockets, clamps, &c., placed around or upon different portions of the outside of the knee. Such appliances, when made sufficiently strong, are liable to be too expensive to come into general use.

In this invention, by means of an internal connection, I provide a means of attaching or holding in position the inner ends of two portions of a boat-knee, which is stronger than any merchantable outside clamp or socket can be made, while it is extremely cheap in cost. I also make provision for the flow of the water back and forth in the boat. In a knee provided with a metallic socket, above referred to, provision may be made by removing a portion from the under side of such socket, as in Letters Patent numbered 174,595, granted to me March 7, 1876, while in bent knees the corner or bent portion does not make a true angle, but presents a curved corner, thus forming a natural scupper. I produce a space or scupper for the flow of the water in the boat by cutting off the corner formed by the meeting of the two portions of the boat-knee, as shown in the drawings.

Figure 2:
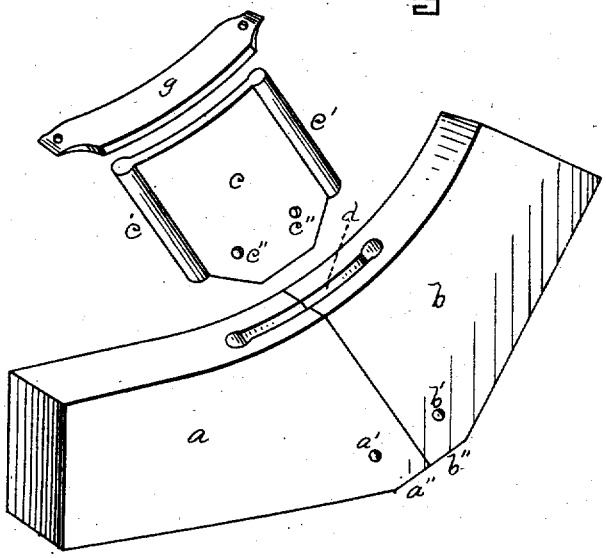

In the accompanying drawings, in which similar letters of reference indicate like parts, Figure 1 is a view in perspective of a boat-knee embodying my invention. Fig. 2 is a similar view with the parts represented as having been separated.

*a* and *b* represent two portions of a boat-knee. *c* is a metallic piece, which forms an interior connection, tightly holding together the parts *a* and *b*. It will be seen that the edges *c′ c′* are made thicker than the central portion. The opening *d* is made of the shape of the connecting-piece *c*, so that when it is in the corresponding opening, *d*, there can be no possibility of the parts *a* and *b* separating. These edges *c′ c′* may be made of many different shapes, and the general form of the metallic connection could be somewhat varied and the object accomplished.

I do not propose to confine myself to the exact shape illustrated. The connecting-piece *c* may extend to the bottom of the knee or not, as desired. Preferably but a small portion, if any, would pierce the bottom, as the under side of the knee might require subsequent beveling to fit into the boat near the bow, for example, where the bottom is not level.

In case the inner ends of *a* and *b* do not actually touch, but have a partition or plate interposed between them, the connection *c* would pass through such partition or be made of a piece with it.

In order to still further strengthen the knee, a plate, *e*, is placed, one on each side, in the position shown, and rivets *f* passed through said plates and through openings *a′ b′* in the knee and corresponding openings, *c″ c″*, in the connection *c*. The plates *e* are pressed tightly against the knee, so as to force it upon the surfaces of the metallic connection and bind its thick portions.

*g* is a plate placed upon the upper side of the knee to protect it and keep out moisture. It is not, however, an absolutely necessary part of my invention.

In order to provide for the wash or flow of the water in the boat and produce a scupper therein, I cut off the corner of the knee—*i. e.*, that portion of each part *a b* which is on the under side, next the meeting-line of the two parts *a b*, forming the knee, and shown at *a″ b″* in the drawings. The connection *c* is, if deep enough, cut to correspond, as shown in Fig. 2.

Thus it will be seen that a strong and cheap boat-knee is produced by means of an interior connection, and one in which the connecting means take up no valuable space.

Having thus fully described my invention, what I claim, and desire to secure by Letters Patent, is—

1. In combination with two adjoining or adjacent parts of a boat-knee, an interior metallic connection, which, by means of its shape, holds or assists to hold together, or nearly so, the said portions of the knee.

2. In combination with the metallic connection *c*, the plates *g*, substantially as and for the purpose herein set forth.

3. The combination of the parts *a b*, connection *c*, plates *g e*, and rivets *f*, substantially as and for the purpose above described.

4. A boat-knee made in two or more parts, and having its corner removed, substantially as shown at *a''* *b''*, for the purpose set forth.

DAVID TRUE.

Witnesses:

HENRY W. WILLIAMS,
JOSEPH ISHBAUGH.